(12) United States Patent
Nomura

(10) Patent No.: US 10,525,646 B2
(45) Date of Patent: Jan. 7, 2020

(54) CLAMPING DEVICE

(71) Applicants: FUJI SEIKO CO., LTD., Hashima-Shi, Gifu-Ken (JP); FUJI SHOJI CO., LTD., Hashima-Shi, Gifu-Ken (JP)

(72) Inventor: Shigeaki Nomura, Hashima (JP)

(73) Assignees: FUJI SEIKO CO., LTD. (JP); FUJI SHOJI CO., LTD. (JP)

( * ) Notice: Subject to any disclaimer, the term of this patent is extended or adjusted under 35 U.S.C. 154(b) by 399 days.

(21) Appl. No.: 15/504,910

(22) PCT Filed: Aug. 27, 2014

(86) PCT No.: PCT/JP2014/072424
§ 371 (c)(1),
(2) Date: Feb. 17, 2017

(87) PCT Pub. No.: WO2016/030988
PCT Pub. Date: Mar. 3, 2016

(65) Prior Publication Data
US 2017/0274609 A1 Sep. 28, 2017

(51) Int. Cl.
*B29D 30/48* (2006.01)

(52) U.S. Cl.
CPC ........ *B29D 30/48* (2013.01); *B29D 2030/487* (2013.01); *B29D 2030/488* (2013.01)

(58) Field of Classification Search
CPC .............. B29D 30/48; B29D 2030/487; B29D 2030/488
USPC .................................................. 156/398, 422
See application file for complete search history.

(56) References Cited

U.S. PATENT DOCUMENTS

2003/0116254 A1   6/2003   Sata

FOREIGN PATENT DOCUMENTS

| JP | 09267410 A | * 10/1997 | ............ B29D 30/48 |
|---|---|---|---|
| JP | H10-166473 A | 6/1998 | |
| JP | 2000-233378 A | 8/2000 | |
| JP | 2003-154581 A | 5/2003 | |
| JP | 2006289733 A | 10/2006 | |
| JP | 2010-173131 A | 8/2010 | |
| JP | 2011079133 A | 4/2011 | |

OTHER PUBLICATIONS

Kenji Nakao, JP-09267410-A, machine translation. (Year: 1997).*
International Preliminary Report on Patentability for Application No. PCT/JP2014/072427 dated Feb. 28, 2017.
International Preliminary Report on Patentability for Application No. PCT/JP2014/072424 dated Feb. 28, 2017.
International Search Report for Application No. PCT/JP2014/072424 dated Oct. 21, 2014.

* cited by examiner

*Primary Examiner* — Robert C Dye
*Assistant Examiner* — Sedef E Paquette
(74) *Attorney, Agent, or Firm* — Tarolli, Sundheim, Covell & Tummino LLP (57) ABSTRACT

A clamping device includes a first clamp for clamping the distal end of a steel wire at a position corresponding to a first winding groove and a second clamp for clamping the distal end of a steel wire at a position corresponding to a second winding groove.

1 Claim, 7 Drawing Sheets

CLAMPING DEVICE

RELATED APPLICATIONS

The present invention is a U.S. National Stage under 35 USC 371 patent application, claiming priority to Serial No. PCT/JP2014/072424, filed on 27 Aug. 2014; the entirety of which is incorporated herein by reference.

TECHNICAL FIELD

The present invention relates to a clamping device that is coupled to a former and includes a clamp, which clamps the distal end of a steel wire.

BACKGROUND ART

Patent document 1 describes an example of a clamping device that is known in the art. The clamping device clamps the distal end of a steel wire on a former when forming a bead core, which is embedded in a bead of a tire.

The clamping device includes two opposing walls, which function as a clamp. When the distal end of the steel wire is inserted into the gap formed between the two opposing walls, the distal end of the steel wire is clamped on the former. The clamping device is coupled to the former so that the gap between the two opposing walls is located at a position corresponding to a steel wire winding groove that is formed in a circumferential surface of the former.

PRIOR ART DOCUMENT

Patent Document

Patent Document 1: Japanese Laid-Open Patent Publication No. 10-166473

SUMMARY OF THE INVENTION

Problems that are to be Solved by the Invention

When the former includes a plurality of winding grooves and the distal end of the steel wire is to be clamped at a position corresponding to every winding groove, more than one clamping device of patent document 1 would be necessary.

It is an object of the present invention to provide a clamping device that clamps a steel wire at a position corresponding to every winding groove with the same clamping device.

Means for Solving the Problems

To achieve the above object, a clamping device of the present invention is coupled to a former having a circumferential surface that includes a first winding groove and a second winding groove. The clamping device includes a first clamp for clamping the distal end of a steel wire at a position corresponding to the first winding groove and a second clamp for clamping the distal end of a steel wire at a position corresponding to the second winding groove.

Since the clamping device includes the first clamp and the second clamp, a steel wire is clamped by the same clamping device at a position corresponding to every winding groove, namely, the first winding groove and the second winding groove.

Effect of the Invention

The clamping device succeeds in clamping a steel wire at a position corresponding to every winding groove with the same clamping device.

MODES FOR CARRYING OUT THE INVENTION

A bead core formation apparatus 1 according to one embodiment will now be described.

Figure 1:
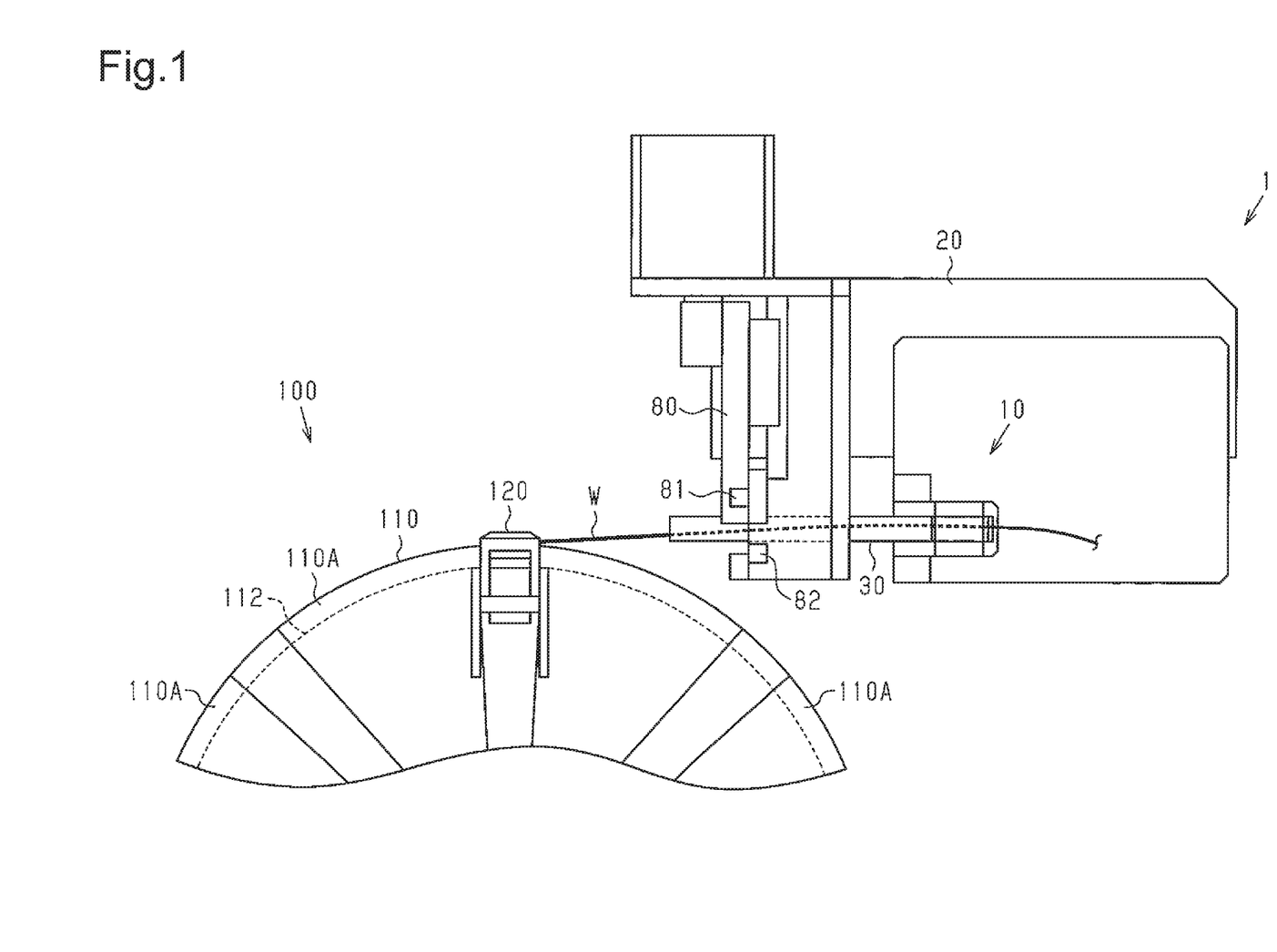
FIG. 1 is a front view of a bead core formation apparatus according to one embodiment.

As shown in FIG. 1, the bead core formation apparatus 1 includes a guide device 10, through which a rubber-coated steel wire W passes, a cutting device 80, which cuts the steel wire W, and a winding device 100, which forms a bead core by winding the steel wire W that is fed by the guide device 10. The steel wire W is bent in conformance with the diameter of a bead prior to being fed to the guide device 10 by a feeding roller (not shown).

Figure 2:
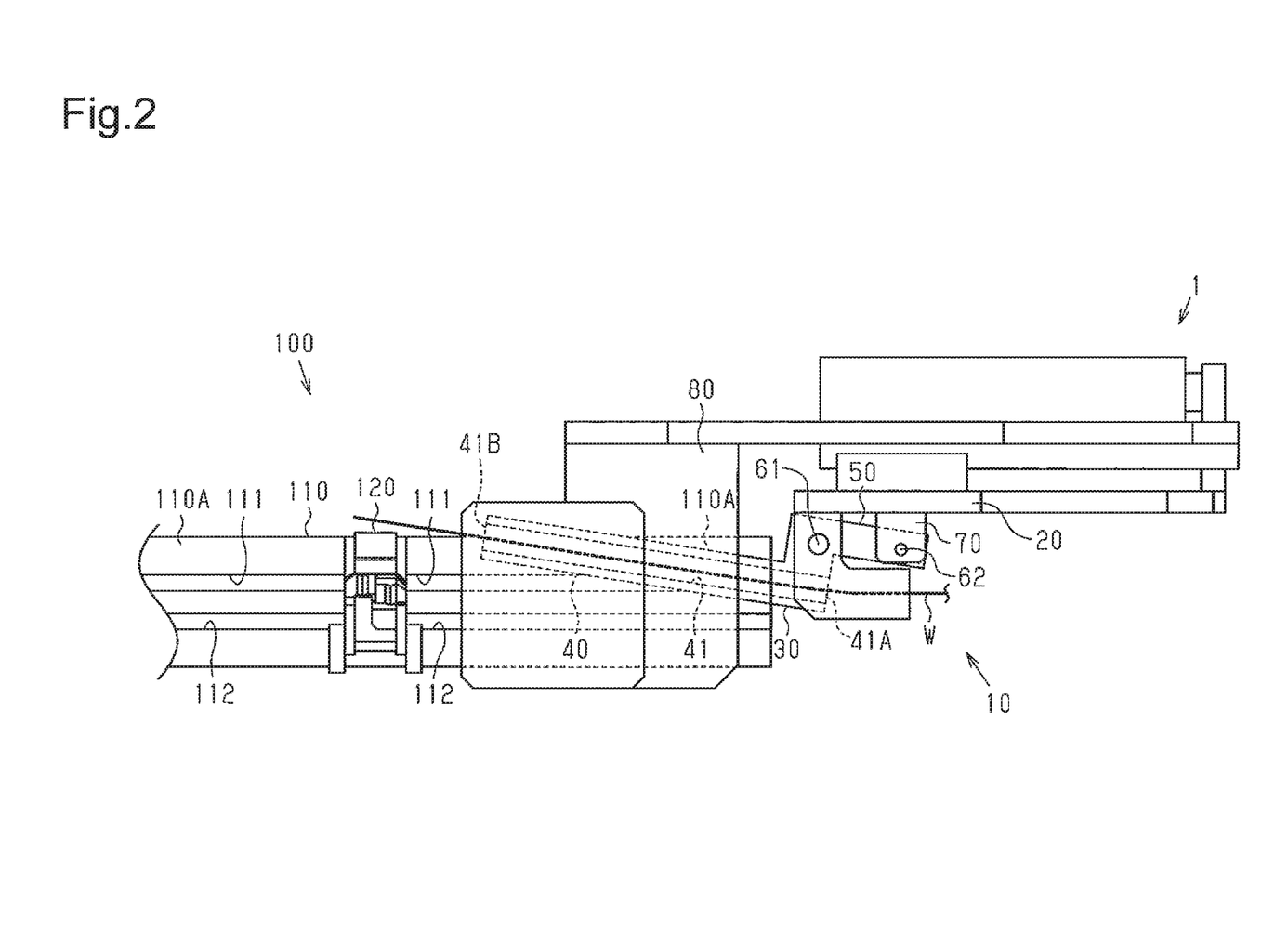
FIG. 2 is a plan view of the bead core formation apparatus shown in FIG. 1.

As shown in FIG. 2, the guide device 10 includes a device body 20 to which a steel wire passing portion 30 is coupled. The steel wire passing portion 30 includes a guideway 41 through which the fed steel wire W passes.

The steel wire passing portion 30 is connected to a piston rod 70 of a cylinder (not shown) by a connection shaft 62. The piston rod 70 is coupled to the device body 20. The piston rod 70 is driven to rotate the steel wire passing portion 30 about a rotation shaft 61.

As shown in FIG. 1, the cutting device 80 includes an upper blade 81, which is attached to be vertically movable relative to the device body 20, and a lower blade 82, which is fixed to the device body 20. After the steel wire W is wound around the winding device 100, the upper blade 81 and the lower blade 82 cut the steel wire W.

As shown in FIG. 2, the winding device 100 includes a former 110, around which the fed steel wire W is wound, and a clamping device 120, which is coupled to the former 110 to clamp the distal end of the steel wire W on the former 110.

The former 110 includes separate segments 110A, which are arranged to be circular as a whole. The segments 110A have a known structure that allows for reduction and enlargement of the diameter. Each segment 110A has a circumferential surface that includes a first winding groove 111 and a second winding groove 112, which are arranged in an axial direction of the former 110. The first winding groove 111 and the second winding groove 112 have different cross-sectional shapes in accordance with the shapes of bead cores that are formed. After the bead core is formed by winding the steel wire W in one of the first winding groove 111 and the second winding groove 112, the segments 110A are reduced in diameter. This allows the formed bead core to be removed from the former 110.

The clamping device 120 is coupled between adjacent ones of the segments 110A of the former 110.

Figure 3:
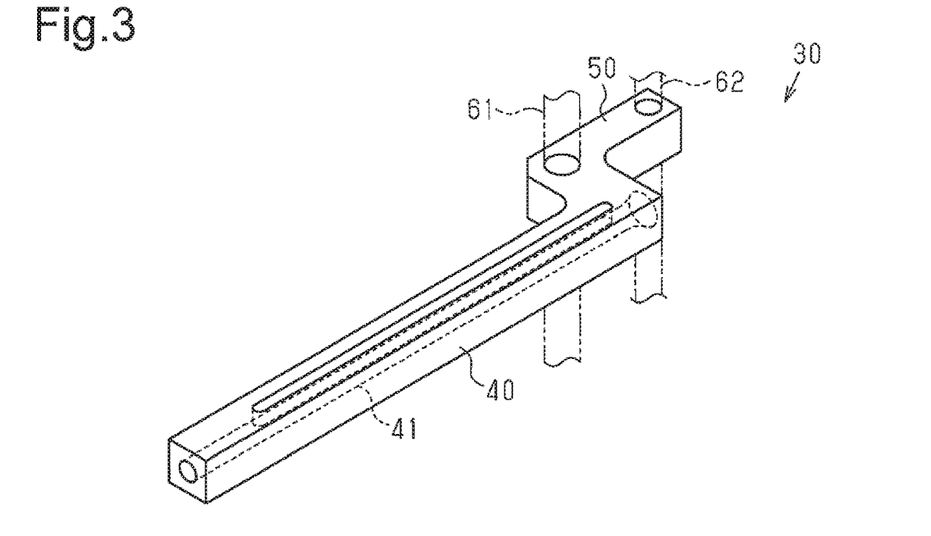
FIG. 3 is a perspective view showing a steel wire passing portion of the embodiment.

As shown in FIG. 3, the steel wire passing portion 30 includes a body 40, which includes the guideway 41 through which the steel wire W passes, and a base 50, which is continuous with the body 40.

The structure of the clamping device 120 will now be described with reference to FIGS. 4 to 6.

Figure 4:
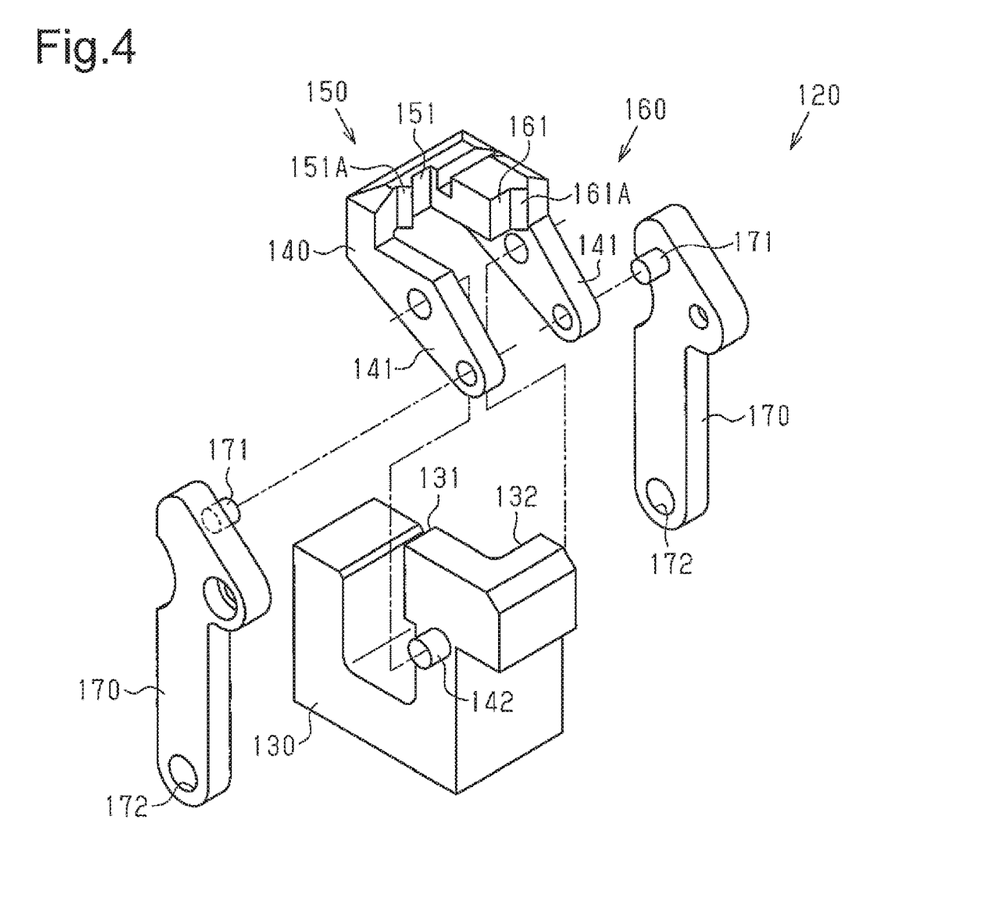
FIG. 4 is an exploded perspective view showing a clamping device of the embodiment.
Figure 5:
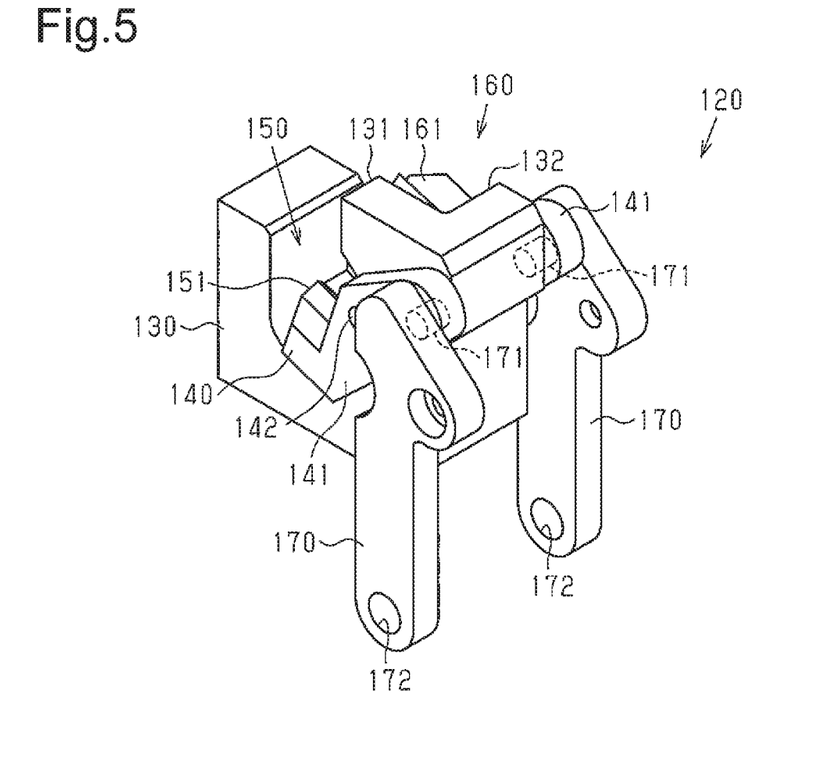
FIG. 5 is a perspective view of the clamping device of the embodiment.
Figure 6:
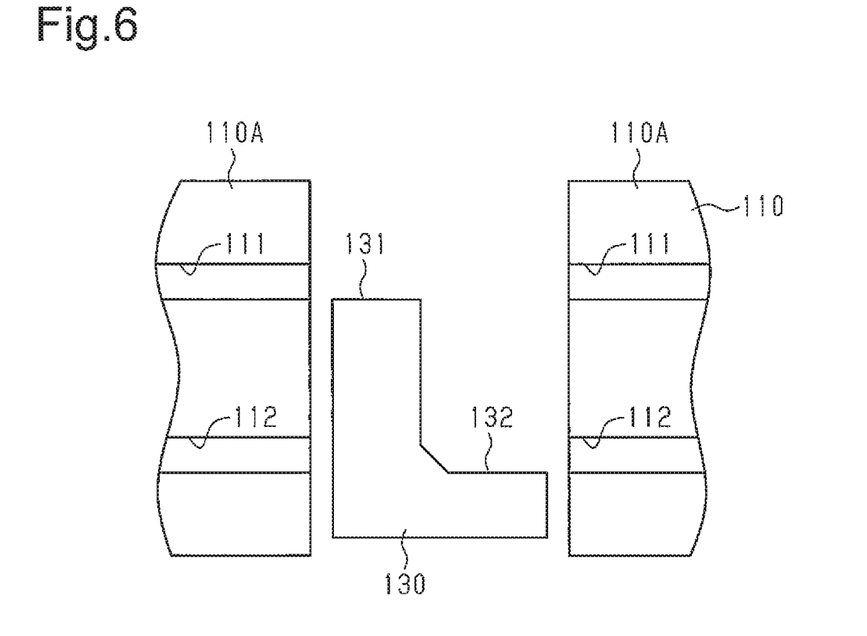
FIG. 6 is a diagram showing the relationship between first and second base walls and first and second winding grooves.

As shown in FIGS. 4 and 5, the clamping device 120 includes a clamp base 130, which is coupled to the former 110, a moving body 140, which is moved relative to the clamp base 130, and two moving legs 170, which are connected to the moving body 140.

The clamp base 130 includes a first base wall 131 and a second base wall 132, which are used to hold the distal end of the fed steel wire W. The first base wall 131 and the second base wall 132 are located at the highest position of the clamp base 130. As shown in FIG. 6, the first base wall 131 is provided corresponding to the first winding groove 111. The second base wall 132 is provided corresponding to the second winding groove 112.

The moving body 140 includes two rotation legs 141, which are rotationally coupled to the clamp base 130 so that a portion of the clamp base 130 including the base walls 131, 132 is held between the two rotation legs 141. The rotation legs 141 are rotated about a rotation shaft 142, which penetrates the clamp base 130.

The moving body 140 includes a first clamp wall 151, which is located between the two rotation legs 141. The distal end of the steel wire W can be held between and clamped by the first clamp wall 151 and the first base wall 131 at a position corresponding to the first winding groove 111 (refer to FIG. 2). The first clamp wall 151 includes a projection 151A. The first clamp wall 151 and the first base wall 131 form a first clamp 150.

The moving body 140 includes a second clamp wall 161, which is located between the two rotation legs 141. The distal end of the steel wire W can be held between and clamped by the second clamp wall 161 and the second base wall 132 at a position corresponding to the second winding groove 112 (refer to FIG. 2). The second clamp wall 161 includes a projection 161A. The second clamp wall 161 and the second base wall 132 form a second clamp 160.

The position where the first clamp 150 or the second clamp 160 holds the distal end of the steel wire W, that is, the position of the moving body 140 when each clamp wall 151, 161 is opposed to the corresponding base wall 131, 132, is referred to as the clamping position. Also, the position where the first clamp 150 and the second clamp 160 do not hold the distal end of the steel wire W, that is, the position of the moving body 140 when each clamp wall 151, 161 is not opposed to the corresponding base wall 131, 132, is referred to as the non-clamping position.

FIG. 5 shows the clamping device 120 when the moving body 140 is located at the non-clamping position. As shown in FIG. 5, when the moving body 140 is located at the non-clamping position, a section adjacent to each base wall 131, 132 is vacant. Additionally, when the moving body 140 is located at the non-clamping position, the clamp walls 151, 161 are located at a lower position than the base walls 131, 132 in the height-wise direction of the clamping device 120, that is, below the winding grooves 111, 112 of the former 110.

Each moving leg 170 is connected to the corresponding rotation leg 141 by a connection shaft 171 so that the two rotation legs 141 are located between the two moving legs 170. Each moving leg 170 includes a hole 172. The holes 172 are rotationally connected to the distal end of an actuator (not shown).

The operation of the bead core formation apparatus 1 will now be described with reference to FIGS. 7 to 12. The former 110 is not shown in FIGS. 7, 9, and 11.

First, the operation of the bead core formation apparatus 1 when the steel wire W is wound in the first winding groove 111 will be described.

Figure 7:
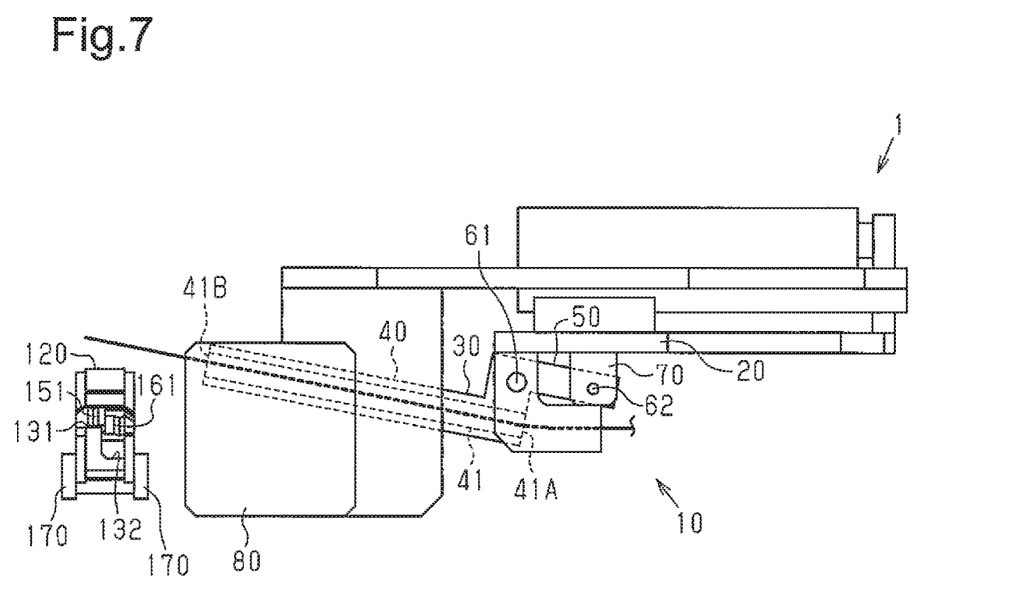
FIG. 7 is a plan view of the bead core formation apparatus of the embodiment when the steel wire passing portion is rotating the distal end of a steel wire toward the first base wall.
Figure 8:
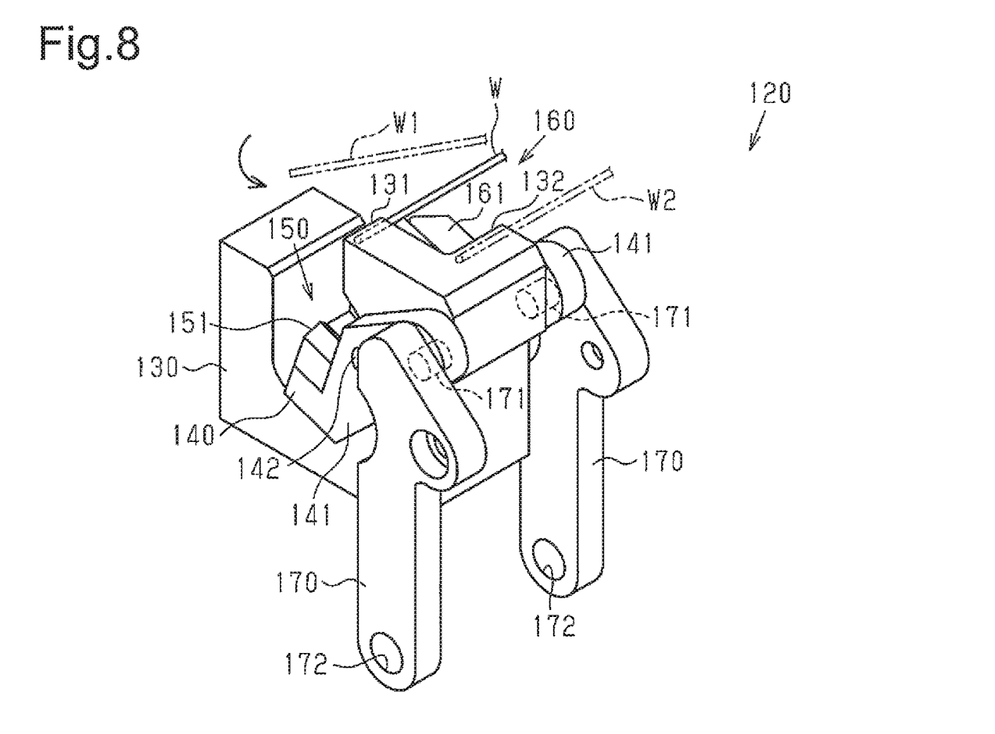
FIG. 8 is a perspective view of the clamping device shown in FIG. 5.

As shown in FIG. 7, when the piston rod 70 is projected from the device body 20, the steel wire W, which is bent in a predetermined shape, is fed to pass through the guideway 41 of the steel wire passing portion 30. After the distal end of the steel wire W is fed to a predetermined position, the feeding of the steel wire W is stopped. At this time, as shown in FIG. 8 with a steel wire W1 indicated by a double-dashed line, the distal end of the steel wire W is located at a position separated from the first base wall 131 and the second base wall 132.

Figure 9:
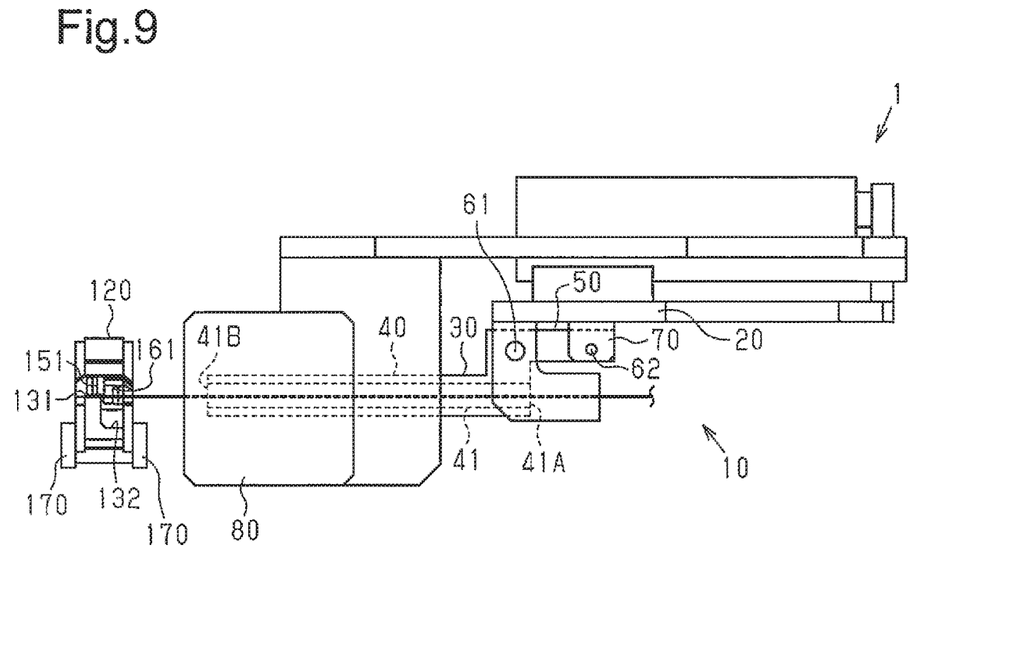
FIG. 9 is a plan view of the bead core formation apparatus when the distal end of the steel wire is opposed to the first base wall.

After the distal end of the steel wire W is positioned in place in the feeding direction in this manner, the piston rod 70 is retracted. This rotates the steel wire passing portion 30 about the rotation shaft 61 as shown in FIG. 9. Consequently, the distal end of the steel wire W is moved to a position opposed to the first base wall 131 as indicated by a solid line in FIG. 8.

Figure 10:
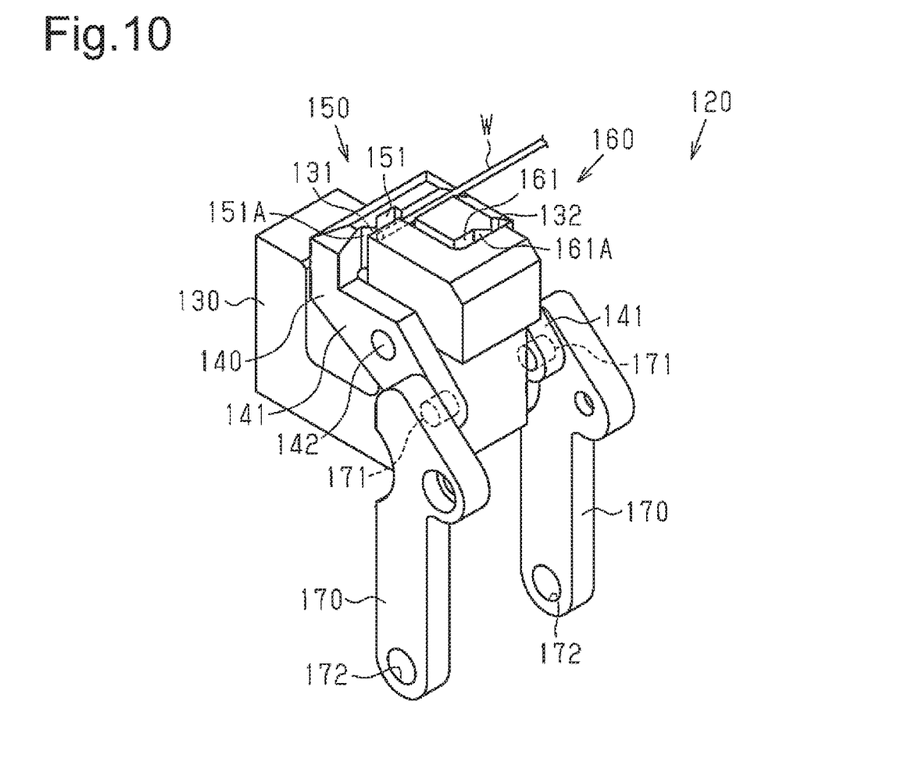
FIG. 10 is a perspective view of the clamping device when the distal end of the steel wire is held between the first clamp wall and the first base wall.

As shown in FIG. 10, when the moving legs 170 are forced downward by the actuator (not shown), portions of the rotation legs 141 that are connected to the moving legs 170 by the connection shafts 171 are forced downward. This rotates the moving body 140 about the rotation shaft 142. Consequently, the first base wall 131 is opposed to the first clamp wall 151. More specifically, when the moving body 140 is moved from the non-clamping position to the clamping position, the steel wire W is held between the first clamp wall 151 and the first base wall 131. Thus, the steel wire W is clamped by the first clamp 150.

Next, the operation of the bead core formation apparatus 1 when the steel wire W is wound in the second winding groove 112 will be described.

Figure 11:
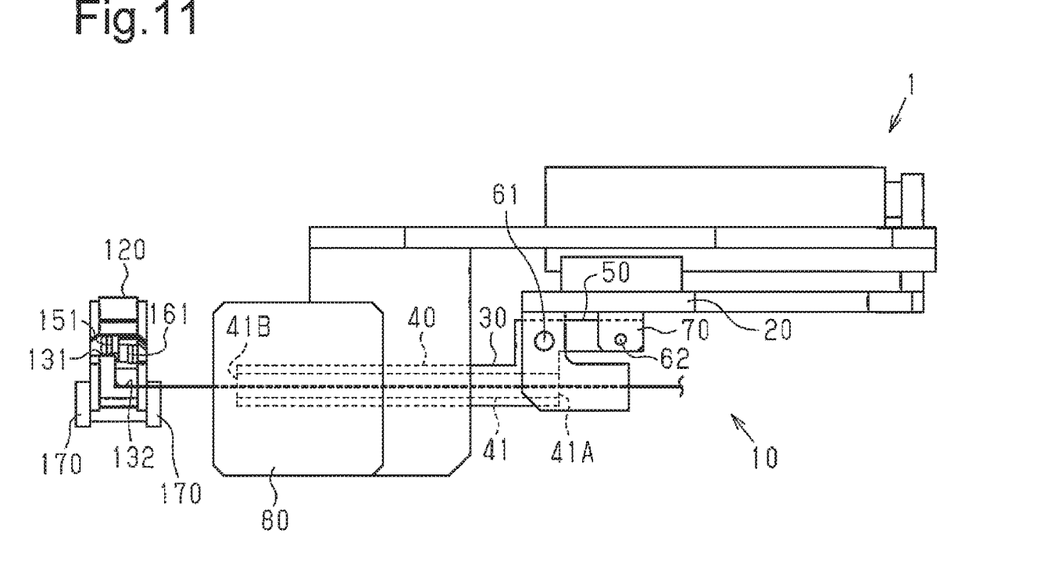
FIG. 11 is a plan view of the bead core formation apparatus when the distal end of the steel wire is opposed to the second base wall.

After the distal end of the steel wire W is positioned in place in the feeding direction, the piston rod 70 is retracted from the position shown in FIG. 7 to the position shown in FIG. 11. This rotates the steel wire passing portion 30 about the rotation shaft 61. Consequently, as shown in FIG. 8 with a steel wire W2 indicated by a double-dashed line, the distal end of the steel wire W is moved to a position opposed to the second base wall 132.

Figure 12:
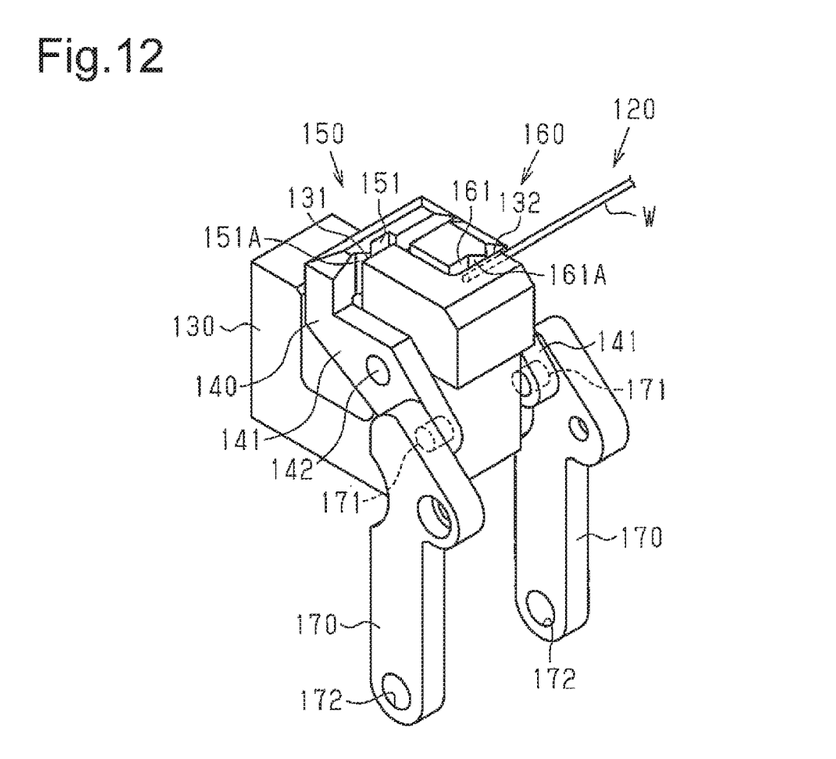
FIG. 12 is a perspective view of the clamping device when the distal end of the steel wire is held between the second clamp wall and the second base wall.

As shown in FIG. 12, when the moving legs 170 are forced downward by the actuator (not shown), portions of the rotation legs 141 that are connected to the moving legs 170 by the connection shafts 171 are forced downward. This rotates the moving body 140 about the rotation shaft 142. Consequently, the second base wall 132 is opposed to the second clamp wall 161. More specifically, when the moving body 140 is moved from the non-clamping position to the clamping position, the steel wire W is held between the second clamp wall 161 and the second base wall 132. Thus, the steel wire W is clamped by the second clamp 160.

As described above, the distal end of the steel wire W is clamped by the first clamp 150 or the second clamp 160. Additionally, the segments 110A of the former 110 are enlarged in diameter. Then, the steel wire passing portion 30 is moved away from the winding device 100, and the former 110 is rotated to wind the steel wire W around the first winding groove 111 or the second winding groove 112 a predetermined number of times. After the steel wire W is wound in the first winding groove 111 or the second winding groove 112, the steel wire W is cut by the cutting device 80. Subsequently, the segments 110A of the former 110 are reduced in diameter, and the moving body 140 is moved from the clamping position to the non-clamping position. This unclamps the distal end of the steel wire W from the clamping device 120, and the bead core is obtained.

The embodiment has the advantages described below.

(1) The clamping device 120 includes the first clamp 150 and the second clamp 160. This allows the clamping device 120 to clamp the distal end of the steel wire W at a position corresponding to every winding groove, namely, the first winding groove 111 and the second winding groove 112.

(2) The first clamp wall 151 of the clamp 150 and the second clamp wall 161 of the clamp 160 are provided in the single moving body 140. This simplifies the structure of the clamping device 120 as compared to a structure in which the clamp walls 151, 161 are provided in separate moving bodies.

(3) In the bead core formation apparatus 1, after the distal end of the steel wire W is moved to a position opposed to one of the first base wall 131 and the second base wall 132 by the steel wire passing portion 30, the distal end of the steel wire W is held and clamped by the one of the first clamp wall 151 and the second clamp wall 161. More specifically, the distal end of the steel wire W will not be moved in the feeding direction when the distal end of the steel wire W is in contact with the base walls 131, 132 and the clamp walls 151, 161. This reduces the friction between the distal end of the steel wire W and the clamping device 120. Thus, damage to the steel wire W is limited.

(4) The first clamp wall 151 includes the projection 151A. This allows the first clamp 150 to clamp the distal end of the steel wire W more strongly than when the first clamp wall 151 is configured to have a flat surface.

(5) The second clamp wall 161 includes the projection 161A. This allows the second clamp 160 to clamp the distal end of the steel wire W more strongly than when the second clamp wall 161 is configured to have a flat surface.

The embodiment may be modified as follows.

Knurling may be performed on at least one of the first clamp wall 151 and the first base wall 131. In this structure, when the first clamp 150 clamps the distal end of the steel wire W, damage to the distal end of the steel wire W is limited.

Knurling may be performed on at least one of the second clamp wall 161 and the second base wall 132. In this structure, when the second clamp 160 clamps the distal end of the steel wire W, damage to the distal end of the steel wire W is limited.

DESCRIPTION OF REFERENCE CHARACTERS

110 . . . former, 111 . . . first winding groove, 112 . . . second winding groove, 120 . . . clamping device, 130 . . . clamp base, 131 . . . first base wall, 132 . . . second base wall, 140 . . . moving body, 150 . . . first clamp, 151 . . . first clamp wall, 160 . . . second clamp, 161 . . . second clamp wall, W . . . steel wire.

The invention claimed is:

1. A clamping device coupled to a former having a circumferential surface, wherein the circumferential surface includes a first winding groove and a second winding groove, the clamping device comprising:
a clamp base coupled to the former, the clamp base including a first base wall and a second base wall;
a moving body that is movable relative to the clamp base;
a first clamp for clamping a distal end of a steel wire at a position corresponding to the first winding groove, the first clamp including a first clamp wall, wherein the steel wire corresponding to the first winding groove can be held between the first base wall and the first clamp wall;
a second clamp for clamping a distal end of a steel wire at a position corresponding to the second winding groove, the second clamp including a second clamp wall, wherein the steel wire corresponding to the second winding groove can be held between the second base wall and the second clamp wall,
wherein the first clamp wall and the second clamp wall are provided in the moving body,
wherein the moving body is rotationally coupled to the clamp base,
wherein the moving body is moved between a clamping position where the steel wire corresponding to the first winding groove or the second winding groove is held between the moving body and the clamp base and a non-clamping position where the steel wire corresponding to the first winding groove or the second winding groove is not held between the moving body and the clamp base, and
wherein when the moving body is located at the non-clamping position, the first clamp wall and the second clamp wall are located at a lower position than the first base wall and the second base wall.

* * * * *